(12) United States Patent
Yokoi et al.

(10) Patent No.: US 7,885,155 B2
(45) Date of Patent: Feb. 8, 2011

(54) DATA READOUT METHOD, DATA READOUT DEVICE, AND OPTICAL DISK

(75) Inventors: Kenya Yokoi, Kanagawa (JP); Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 804 days.

(21) Appl. No.: 11/826,129

(22) Filed: Jul. 12, 2007

(65) Prior Publication Data
US 2008/0025190 A1 Jan. 31, 2008

(30) Foreign Application Priority Data
Jul. 26, 2006 (JP) .............................. 2006-203101

(51) Int. Cl.
*G11B 7/00* (2006.01)
(52) U.S. Cl. ................ 369/47.5; 369/13.26; 369/47.53; 369/47.51; 369/53.22; 369/53.26
(58) Field of Classification Search ............ 369/124.04, 369/284, 53.26, 53.27, 47.5, 47.53, 13.26, 369/47.51, 53.22
See application file for complete search history.

(56) References Cited
U.S. PATENT DOCUMENTS

| | | | | |
|---|---|---|---|---|
| 5,841,747 A * | 11/1998 | Kubota et al. | | 369/47.52 |
| 5,886,973 A * | 3/1999 | Iida | | 369/47.5 |
| 6,430,128 B1 * | 8/2002 | Kato et al. | | 369/47.53 |
| 6,524,766 B1 * | 2/2003 | Ariyoshi et al. | | 430/270.13 |
| 6,965,556 B1 * | 11/2005 | Kikukawa et al. | | 369/284 |
| 2003/0156515 A1 * | 8/2003 | Zhou et al. | | 369/47.53 |
| 2005/0157631 A1 | 7/2005 | Lee et al. | | |
| 2005/0190670 A1 | 9/2005 | Kim et al. | | |

FOREIGN PATENT DOCUMENTS

| | | |
|---|---|---|
| CN | 1290932 | 4/2001 |
| EP | 1067534 | 1/2001 |
| JP | 7-73506 A | 3/1995 |
| JP | 2001-052386 | 2/2001 |
| JP | 3292773 | 3/2002 |
| JP | 2003-016653 | 1/2003 |
| JP | 3571624 | 7/2004 |
| JP | 3762922 | 1/2006 |
| WO | WO 2005/064601 A1 | 7/2005 |
| WO | WO 2005/078709 A1 | 8/2005 |

OTHER PUBLICATIONS

China Second Office Action w/ English translation 2007101381513 dated Jun. 26, 2009 (8 pages).
Bing-Mau Chen, et al., "Rewritable and Initialization-Free $AgO_x$-Type Super-Resolution Optical Recording Medium," Jpn. J. Appl. Phys., 2003, vol. 42, pp. 995-996.
Inoh Hwang, et al., "Improvement of Noise Characteristics in Super-RENS Disc," ISOM Technical Digest, 2004, pp. 66-67.
U.S. Appl. No. 11/717,633, filed Mar. 14, 2007, Kasahara.
European Search Report dated Dec. 11, 2007.

* cited by examiner

*Primary Examiner*—Wayne R Young
*Assistant Examiner*—Linh T Nguyen
(74) *Attorney, Agent, or Firm*—Dickstein Shapiro LLP

(57) ABSTRACT

A data readout method is disclosed that is able to read data from an optical disk capable of super resolution readout with high accuracy. The data readout method allows reading data recorded in an optical disk by irradiating a laser beam onto the optical disk. The method includes the steps of varying a light emission power level of the laser beam while the laser beam is irradiated onto the optical disk, and acquiring a reflectivity of the optical disk corresponding to each light emission power level; calculating a second derivative of a curve representing correlation between the reflectivity and the light emission power with respect to the light emission power; calculating an extreme value of the second derivative; and calculating an optimum readout power level for super resolution readout based on the extreme value.

6 Claims, 9 Drawing Sheets

DATA READOUT METHOD, DATA READOUT DEVICE, AND OPTICAL DISK

BACKGROUND OF THE INVENTION

1. Field of the Invention

The present invention relates to a data readout method, a data readout device, and an optical disk, and in particular, to a data readout method and a data readout device for reading out data recorded in an optical disk, and an optical disk used in the data readout device.

2. Description of the Related Art

In the related art, when reading data recorded in read-only optical disks, such as a CD (Compact Disc), a DVD (Digital Versatile Disc), a Blue-ray Disk, and a HD-DVD, the readout power can be any value within a dynamic range of a detection circuit, and there is no damage to a readout layer formed only of a reflective layer.

In addition, in the related art, when reading data recorded in writable optical disks, such as a CD-R (CD-readable), a CD-RW (CD-rewritable), a DVD-R (DVD-readable), a DVD-RW (DVD-rewritable), a DVD+R (DVD+readable), a DVD+RW (DVD+rewritable), and a DVD-RAM, it is required to use a readout power sufficiently low so as not to eliminate or destroy mark series on a recording layer.

Further, in the related art, for either of the two types of optical disks, usually the readout power can be arbitrarily adjusted by a readout device.

In recent years and continuing, it is required that the optical disks have large capacities. So far, various methods have been proposed to realize large capacity optical disks, for example, one of them is a super resolution readout method. In the super resolution readout method, marks and spaces shorter than the diffraction limit of an optical system are formed on an optical disk to increase recording density and capacity of the optical disk. In addition, a light beam of high power is condensed onto a readout layer made of phase-change materials (this readout layer is referred to as "a super resolution readout layer") to increase the temperature of a portion of the light-condensed area of the readout layer, thereby changing the optical properties (optical constant) of this area. Consequently, it is possible to read out data exceeding the diffraction limit. Currently, read-only optical disks capable of such super resolution readout are in the process of being placed into practical application.

Below, for convenience, a recording density not exceeding the diffraction limit is referred to as a "usual density", and readout of data recorded at the usual density is referred to as "usual readout".

Below, an optical disk capable of the super resolution readout is explained.

FIG. 9A through FIG. 9C are schematic cross-sectional views illustrating examples of configurations of an optical disk capable of the super resolution readout.

The optical disk shown in FIG. 9A has a stacked layer structure including a protection layer and a readout layer on a substrate. For example, the protection layer is formed from $ZnS-SiO_2$, and the readout layer is formed from a phase-change material like AgInSbTe.

The optical disk shown in FIG. 9B is disclosed in "Jpn. J. Appl. Phys., 42, pp 995-996 (2003)" (hereinafter referred to as "reference 1"), which has a stacked layer structure including a protection layer, a readout layer, and a recording layer on a substrate. For example, the protection layer is formed from $ZnS-SiO_2$, the readout layer is formed from GeSbTe, and the recording layer is formed from $AgO_x$.

The optical disk shown in FIG. 9C is disclosed in "ISOM Technical Digest, pp 66-67 (2004)" (hereinafter referred to as "reference 2"), which has a stacked layer structure including a protection layer, a readout layer, and a recording layer on a substrate. For example, the protection layer is formed from $ZnS-SiO_2$, the readout layer is formed from GeSbTe, and the recording layer is formed from $PtO_x$ or W—Si.

A laser beam is incident on the optical disk shown in one of FIG. 9A through FIG. 9C from the substrate side or the side opposite to the substrate to perform data recording and data super resolution readout. During data recording operation, the laser beam is irradiated onto the optical disk at a recording power, thereby forming recording marks on the recording layer. The mechanism of forming the marks on the recording layer depends on the materials of the media. For example, for the AgInSbTe layer of the optical disk shown in FIG. 9A, the recording marks are formed by shape changes; for the $AgO_x$ layer or the $PtO_x$ layer of the optical disks shown in FIG. 9B and FIG. 9C, the recording marks are formed by generation of metal fine particles and bubbles; for the W—Si layer of the optical disk shown in FIG. 9C, the recording marks are formed by chemical reactions between Si and W. Since the recording marks are formed only in locally heated regions within the laser spot, the recording marks can be formed to be shorter than the diffraction limit of the optical system.

In addition to the above recordable optical disks, a read-only super resolution readout optical disk is also proposed, which is fabricated by forming the above mentioned readout layer on a ROM-type substrate, and the ROM-type substrate is molded with a stamper obtained by high density mastering through Deep UV (Ultra Violet) exposure or EB (Electron Beam) exposure.

In a magneto-optic (MO) recording medium, the super resolution readout is realized based on another principle. For example, in a DWDD super resolution readout disclosed in Japanese Laid-Open Patent Application No. 2001-52386 (hereinafter referred to as "reference 3"), since the ratio of amplitudes of readout signals varies slowly near a super resolution readout power, and does not possess linearity, amplitude variations with respect to a long mark series and a short mark series are monitored, and the optimum readout power is determined when the above amplitude variations become equal.

Japanese Patent Gazette No. 3292773 (hereinafter referred to as "reference 4") discloses a technique in which the optimum readout power is determined when a signal amplitude of pre-recorded super resolution readout reproduction pits becomes the maximum.

Japanese Laid-Open Patent Application No. 2003-16653 (hereinafter referred to as "reference 5") discloses a technique in which an error between the current readout power and the optimum readout power is detected based on the magnitude of equalization during adaptive equalization, and the readout power of the laser beam is controlled so that the error becomes zero, namely, the error of a waveform equalization coefficient is minimum.

Japanese Patent Gazette No. 3762922 (hereinafter referred to as "reference 6") discloses a technique in which plural readout signals are produced by modulating the recording light quantity and readout light quantity, and a combination of an optimum recording light quantity and an optimum readout light quantity minimizing an error rate is selected from the plural readout signals; namely, the error rate is minimum.

However, since all of the above techniques are based on detection of the variation of signal amplitudes, or detection of modulated readout signals, because the signal amplitude is small (that is, the sensitivity is low), it is difficult to calculate the optimum readout power, namely, a power that is near a maximum CNR (Carrier-to-Noise Ratio) value of the readout signals and not resulting in degradation of the readout film of the recording medium. Here, the CNR value of the readout signals is an index of a super resolution effect, namely, associated with a largest increase of the signal intensity (carrier level C). Particularly, when a readout film formed of the phase-change materials is used in super resolution readout, the signal amplitude variation is small. Since pit (mark) lengths associated with small signal amplitudes are involved in modulation using PRML (Partial-Response Maximum Likelihood), like the HD-DVD, it is difficult to ensure detection accuracy.

When using a readout device to reproduce the optical disk capable of super resolution readout, first, in order to identify that the optical disk in use is capable of super resolution readout, it is necessary to read out data in a control data area, in which control data are recorded at the usual density. In this case, it is required that the readout power be sufficiently low so as not to induce the super resolution readout. Further, when it is identified that the optical disk in use is capable of the super resolution readout, in order to read a user data area of the optical disk in which user data are recorded at a recording density exceeding the diffraction limit, it is required that the readout power be appropriate so that a readout layer not be destroyed, and the smallest marks (pits) can be read with high signal intensity.

When the readout power used in the super resolution readout is lower than the optimum readout power, the incident light can hardly induce changes of the optical properties in a region in a light spot of the condensed light, and thus only data recorded at the usual density can be read.

When the readout power used in the super resolution readout is higher than the optimum readout power, the incident light induces a too large region in the light spot of the condensed light in which region changes of the optical properties occur, and thus the super resolution readout cannot be realized, or the number of repeated readings is noticeably reduced due to degradation of the readout layer and damage to the recording marks or pits.

In other words, it is necessary to use two levels of readout power having different values for the optical disk which supports the super resolution readout. The readout devices of the related art do not have such a configuration, and are unable to adjust to obtain the optimum readout power.

As disclosed in Japanese Patent Gazette No. 3571624 (hereinafter referred to as "reference 7"), with an OPC (Optimum Power Control) technique of the related art, one may attempt to utilize an increased degree of modulation of a readout signal amplitude; however, in order to calculate the optimum readout power, after detecting the signal amplitude, from the variation of the signal amplitude it is difficult to calculate the optimum readout power with high accuracy when the readout signal is small, as in the super resolution readout.

SUMMARY OF THE INVENTION

The present invention may solve one or more problems of the related art.

A preferred embodiment of the present invention may provide a data readout method and a data readout device able to read data from an optical disk capable of super resolution readout with high accuracy, and such an optical disk.

According to a first aspect of the present invention, there is provided a data readout method for reading data recorded in an optical disk by irradiating a laser beam on the optical disk, said method comprising the steps of:

varying a light emission power of the laser beam while the laser beam is irradiated onto the optical disk, and acquiring a reflectivity of the optical disk corresponding to each light emission power;

calculating a second derivative of a curve representing correlation between the reflectivity and the light emission power with respect to the light emission power;

calculating an extreme value of the second derivative; and calculating an optimum readout power for super resolution readout based on the extreme value, wherein said super resolution readout, data recorded at a recording density beyond a diffraction limit are read out.

According to the present invention, the reflectivity of the optical disk is acquired for each light emission power, and the second derivative of a curve representing correlation between the reflectivity and the light emission power with respect to the light emission power is calculated; then, the extreme value of the second derivative is calculated, and an optimum readout power for super resolution readout is acquired based on the extreme value. Therefore, it is possible to reproduce an optical disk capable of super resolution readout with high accuracy.

According to a second aspect of the present invention, there is provided a data readout device for reading data recorded in an optical disk, comprising:

an optical head that includes
a light emission source,
an optical system directing a laser beam emitted from the light emission source onto the optical disk, and directing light reflected from the optical disk to a light receiving position, and
an optical detector arranged at the light receiving position;

a reflectivity acquisition unit that varies a light emission power level of the laser beam while the laser beam is irradiated onto the optical disk, and acquires a reflectivity of the optical disk corresponding to each light emission power level based on an output signal from the optical detector; and a calculation unit that calculates an extreme value of a second derivative of a curve representing correlation between the reflectivity and the light emission power with respect to the light emission power; and an optimum readout power acquisition unit that acquires an optimum readout power for super resolution readout based on the extreme value, wherein said super resolution readout, data recorded at a recording density beyond a diffraction limit are read out.

According to the present invention, a reflectivity acquisition unit acquires a reflectivity of the optical disk corresponding to each light emission power level, the calculation unit calculates an extreme value of the second derivative of the curve representing correlation between the reflectivity and the light emission power with respect to the light emission power, and a readout power acquisition unit acquires an optimum readout power for super resolution readout based on the extreme value, in which super resolution readout, data recorded at a recording density beyond a diffraction limit are read out.

Therefore, it is possible to reproduce an optical disk capable of super resolution readout with high accuracy.

According to a third aspect of the present invention, there is provided an optical disk, comprising:

a readout layer enabling super resolution readout for reading data recorded at a recording density beyond a diffraction limit, wherein pre-format information is recorded the optical disk, said pre-format information including an index of a second derivative of a curve representing correlation between reflectivity and the light emission power with respect to the light emission power, and an index of a readout power.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
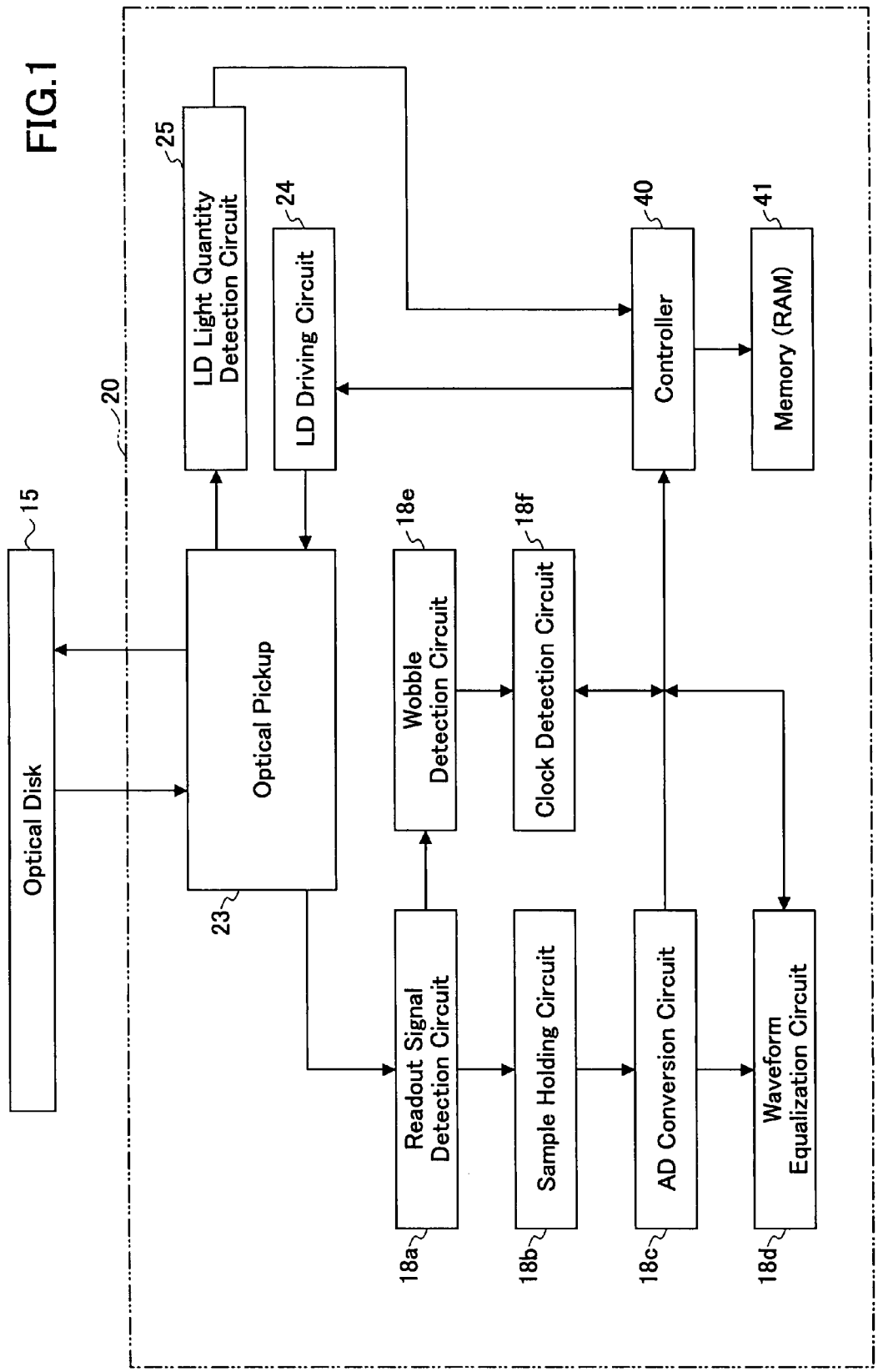
FIG. 1 is a block diagram schematically illustrating a configuration of an optical disk drive 20 according to an embodiment of the present invention.

FIG. 1 is a block diagram schematically illustrating a configuration of an optical disk drive 20 according to an embodiment of the present invention.

As shown in FIG. 1, the optical disk drive 20 includes an optical pickup 23, a readout signal detection circuit 18a, a sample holding circuit 18b, an AD conversion circuit 18c, a waveform equalization circuit 18d, a wobble detection circuit 18e, a clock detection circuit 18f, an LD driving circuit 24, an LD light quantity detection circuit 25, a controller 40, and a memory (RAM) 41.

In FIG. 1, arrows represent flows of principal signals or information, but do not indicate full connection relationships of the blocks.

In the present embodiment, an optical disk 15 is read or written by the optical disk drive 20. The optical disk 15 includes a recording layer in which information is recorded, a reflective layer which reflects incident light, and a readout layer formed of a material allowing the optical constants (such as the real part n of a refraction index, and the imagery part k of the refraction index) to change along with temperature; and moreover, the optical disk 15 is capable of super resolution readout, in which data are recorded at a recording density beyond the diffraction limit. In other words, the optical disk 15 is a super resolution optical disk.

The above components, that is, the recording layer, the reflective layer, and the readout layer, are sandwiched by transparent substrates.

The optical pickup 23 directs a laser beam to be irradiated onto the optical disk 15, and at the same time, receives light reflected from the optical disk 15 (the light reflected from the optical disk 15 is also referred to as "returning light").

Figure 2:
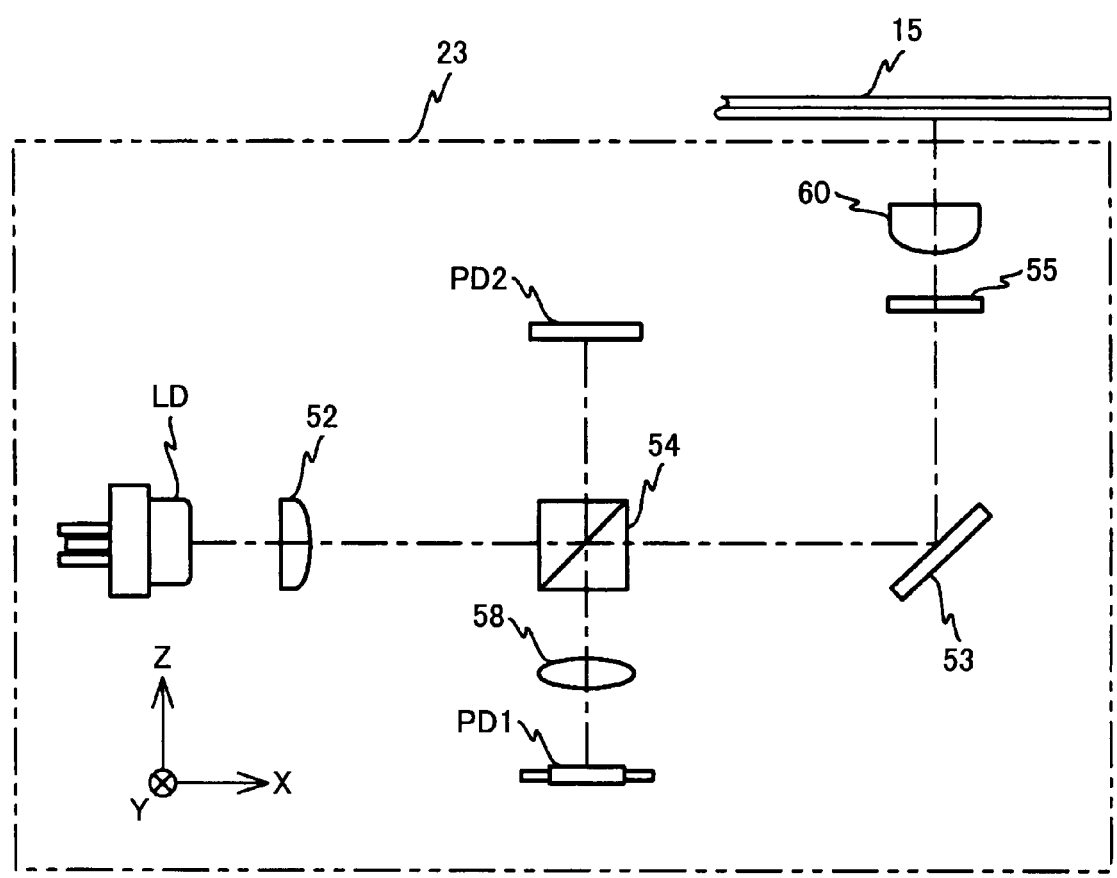
FIG. 2 is a schematic view illustrating an example of the optical pickup 23.

FIG. 2 is a schematic view illustrating an example of the optical pickup 23.

As shown in FIG. 2, the optical pickup 23 includes a light source LD, a collimator lens 52, a polarized beam splitter 54, a mirror 53, a ¼ wave plate 55, an objective lens 60, a detection lens 58, an optical detector PD1, an optical detector PD2, and a driving system (not illustrated).

Note that in this specification the optical axis direction of the collimator lens 52 is defined to be the X-axis direction, the optical axis direction of the objective lens 60 is defined to be the Z-axis direction, and the direction perpendicular to both the X-axis direction and the Z-axis direction is defined to be the Y-axis direction.

The light source LD emits a laser beam having a wavelength suitable for the optical disk 15. Here, assume the maximum intensity of the laser beam from the light source LD is along the +X direction. Further, assume the laser beam emitted from the light source LD is linearly-polarized light, for example, the laser beam is p-polarized light.

The collimator lens 52 is arranged on the +X side of the light source LD to convert the laser beam emitted from the light source LD into a parallel light beam.

The polarized beam splitter 54 is arranged on the +X side of the collimator lens 52 to split a portion of the laser beam in the +Z direction via the collimator lens 52. Further, the polarized beam splitter 54 splits a portion of the returning light from the optical disk 15 and through the objective lens 60 in the −Z direction.

The mirror 53 is arranged on the +X side of the polarized beam splitter 54 to deflect the laser beam through the polarized beam splitter 54 in the +Z direction.

The ¼ wave plate 55 is arranged on the +Z side of the mirror 53 to assign an optical phase difference equaling ¼ wavelength length to the incident light.

The objective lens 60 is arranged on the +Z side of the ¼ wave plate 55 to condense the laser beam through the ¼ wave plate 55.

The detection lens 58 is arranged on the −Z side of the polarized beam splitter 54 to condense the returning light from the optical disk 15, which is directed in the −Z direction by the polarized beam splitter 54, onto a light-receiving surface of the optical detector PD1, which is used for detecting light signal.

The optical detector PD1 has a four-divisional light-receiving surface, and thus has four light-receiving regions. Each of the four light-receiving regions outputs a signal corresponding to the received light quantity (namely, an optoelectric conversion signal). The signals output from the optical detector PD1 include read out information, focus error information, track error information, and others.

The optical detector PD2, which is used for detecting the light quantity of the outgoing light, is arranged on the +Z side of the polarized beam splitter 54 to receive the laser beam split in the +Z direction by the polarized beam splitter 54. The optical detector PD2 outputs signals corresponding to the received light quantity (namely, an optoelectric conversion signal).

The driving system includes a focusing actuator for driving the objective lens 60 in a focusing direction, and a tracking actuator for driving the objective lens 60 in a tracking direction.

For example, the wavelength of the laser beam from the light source LD (referred to as "light source wavelength") is 635 nm, the numeral aperture (NA) of the objective lens 60 is 0.6. The diffraction limit under such conditions is 530 nm, which is approximately equal to (light source wavelength)/(2*NA).

Below, a description is made of operations of the above-described optical pickup 23.

The linearly-polarized laser beam (for example, p-polarized light) emitted from the light source LD is converted into a parallel light beam by the collimator lens 52, and then is incident to the polarized beam splitter 54. The laser beam passing through the polarized beam splitter 54 is deflected by the mirror 53 in the +Z direction, and is then incident onto the ¼ wave plate 55. The ¼ wave plate 55 assigns the incident light an optical phase difference equaling ¼ wavelength to convert the incident light into circularly-polarized light. The laser beam through the ¼ wave plate 55 condensed by the objective lens 60 is arranged on the +Z side of the ¼ wave plate 55 on the optical disk 15.

The returning light from the optical disk 15 becomes circularly-polarized light having a polarization opposite to the incident circularly-polarized light; the returning light is converted into parallel light again by the objective lens 60, and is converted into linearly-polarized light by the ¼ wave plate 55 having a polarization perpendicular to the incident linearly-polarized light (here, it is s-polarized light). The returning laser beam through the ¼ wave plate 55 is deflected by the mirror 53 in the -X direction, and is then incident on the polarized beam splitter 54. The returning laser beam split in the -Z direction by the polarized beam splitter 54 passes through the detection lens 58 and is incident onto the optical detector PD1.

On the other hand, a portion of the laser beam incident on the polarized beam splitter 54 through the collimator lens 52 is split in the +Z direction by the polarized beam splitter 54, and is incident onto the optical detector PD2.

Returning to FIG. 1, the readout signal detection circuit 18*a* detects the readout signals based on output signals from the optical detector PD1. Specifically, the readout signal detection circuit 18*a* performs current-voltage conversion on the signals output from the optical detector PD1; then an accumulative circuit (not illustrated) in the readout signal detection circuit 18*a* sums the converted signals and outputs the resultant signal as the readout signals. Note that the converted signals are also input to the wobble detection circuit 18*e*.

The wobble detection circuit 18*e* detects wobble signals superposed on a tracking error signal based on the output signals from the readout signal detection circuit 18*a*, on which the current-voltage conversion is performed.

The clock detection circuit 18*f* generates a PLL clock signal from the phase at which the readout signal is inverted, and this PLL clock signal serves as a readout clock signal used when reading data. In addition, the clock detection circuit 18*f* generates a PLL clock signal based on the wobble signals from the wobble detection circuit 18*e*, and this PLL clock signal serves as a recording clock signal used when recording data.

The sample holding circuit 18*b* samples the readout signal in synchronization with the readout clock signal. In this way, it is possible to detect a readout signal level (quantity of reflected light) in synchronization with center positions of data patterns.

The AD conversion circuit 18*c* performs AD conversion on the output signal from the sample holding circuit 18*b*. Namely, the AD conversion circuit 18*c* converts a value of the readout signal level to level data. The level data are stored in the memory (RAM) 41 by the controller 40. The readout clock can be used as a synchronous signal for digitizing the readout signal.

The waveform equalization circuit 18*d* performs waveform equalization on the output signals from the AD conversion circuit 18*c*.

The LD driving circuit 24 drives the light source LD of the optical pickup 23.

The LD light quantity detection circuit 25 detects the light quantity of the light from the light source LD based on the output signals from the optical detector PD2.

The controller 40 controls overall operations of the optical disk drive 20.

The memory (RAM) 41 is a working memory of the controller 40.

Figure 3:
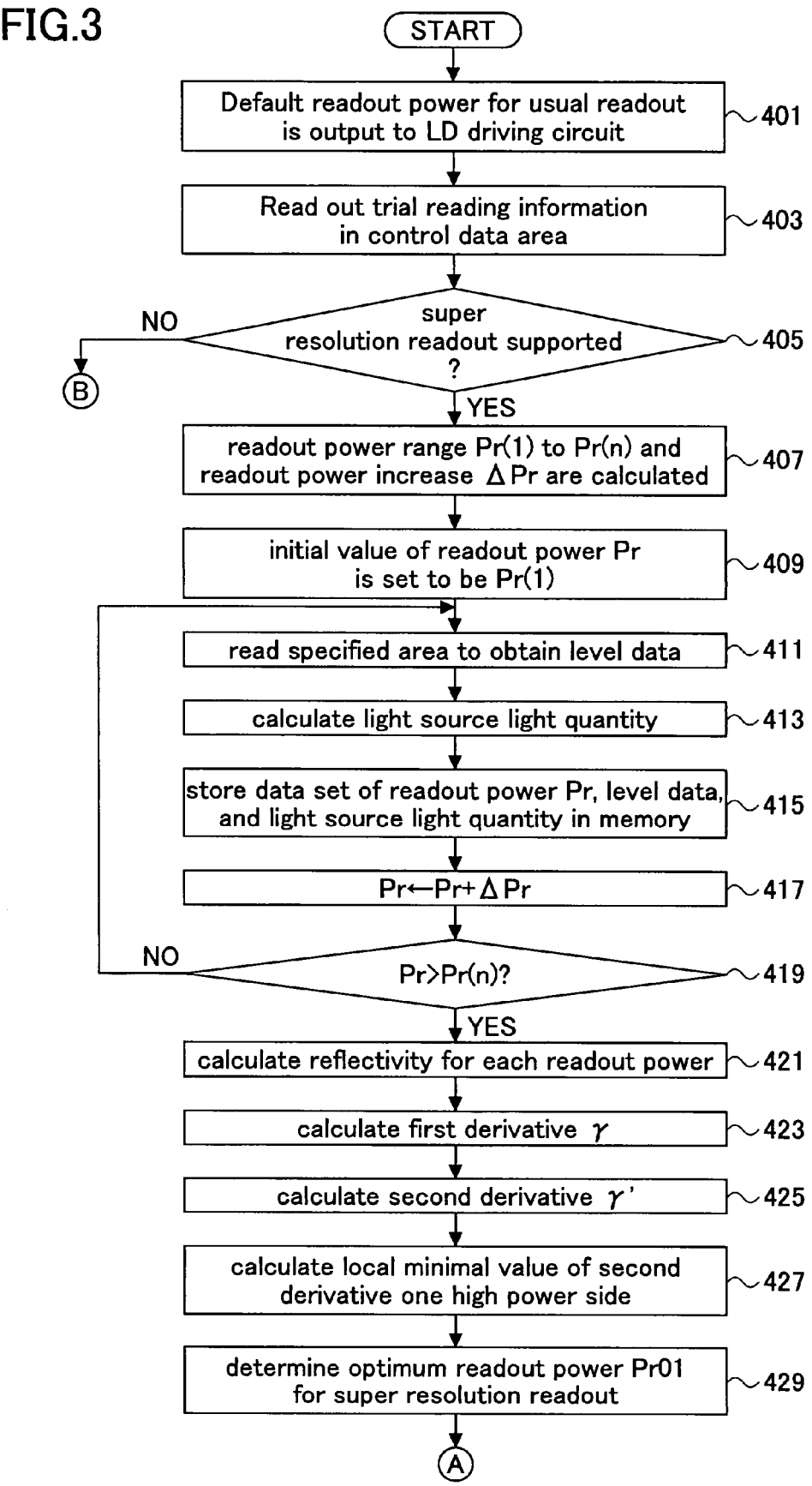
FIG. 3 is a flowchart illustrating the readout operations in the optical disk drive 20.
Figure 4:
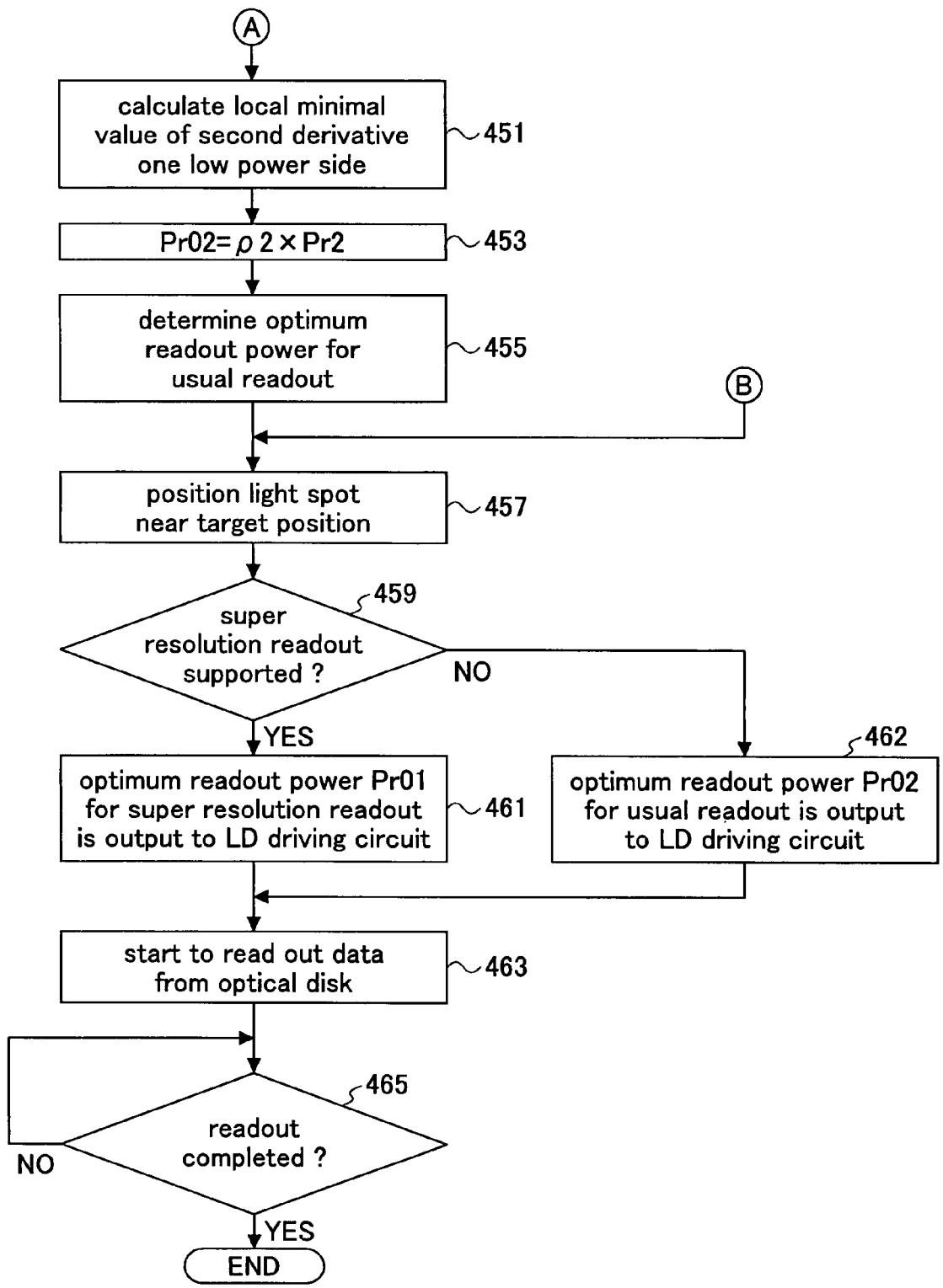
FIG. 4, continuing from FIG. 3, is a flowchart illustrating the readout operations in the optical disk drive 20.

Next, with reference to FIG. 3 and FIG. 4, descriptions are made of operations of the optical disk drive 20 (namely, readout operations) when a high-level device (for example, a personal computer) requests to read out data from the optical disk 15.

FIG. 3 is a flowchart illustrating the readout operations in the optical disk drive 20.

FIG. 4, continuing from FIG. 3, is a flowchart illustrating the readout operations in the optical disk drive 20.

The readout operations shown in FIG. 3 and FIG. 4 correspond to a series of algorithms executed in the controller 40.

Prior to explanations of FIG. 3 and FIG. 4, the optical disk 15 of the present embodiment is described first.

Figure 5:
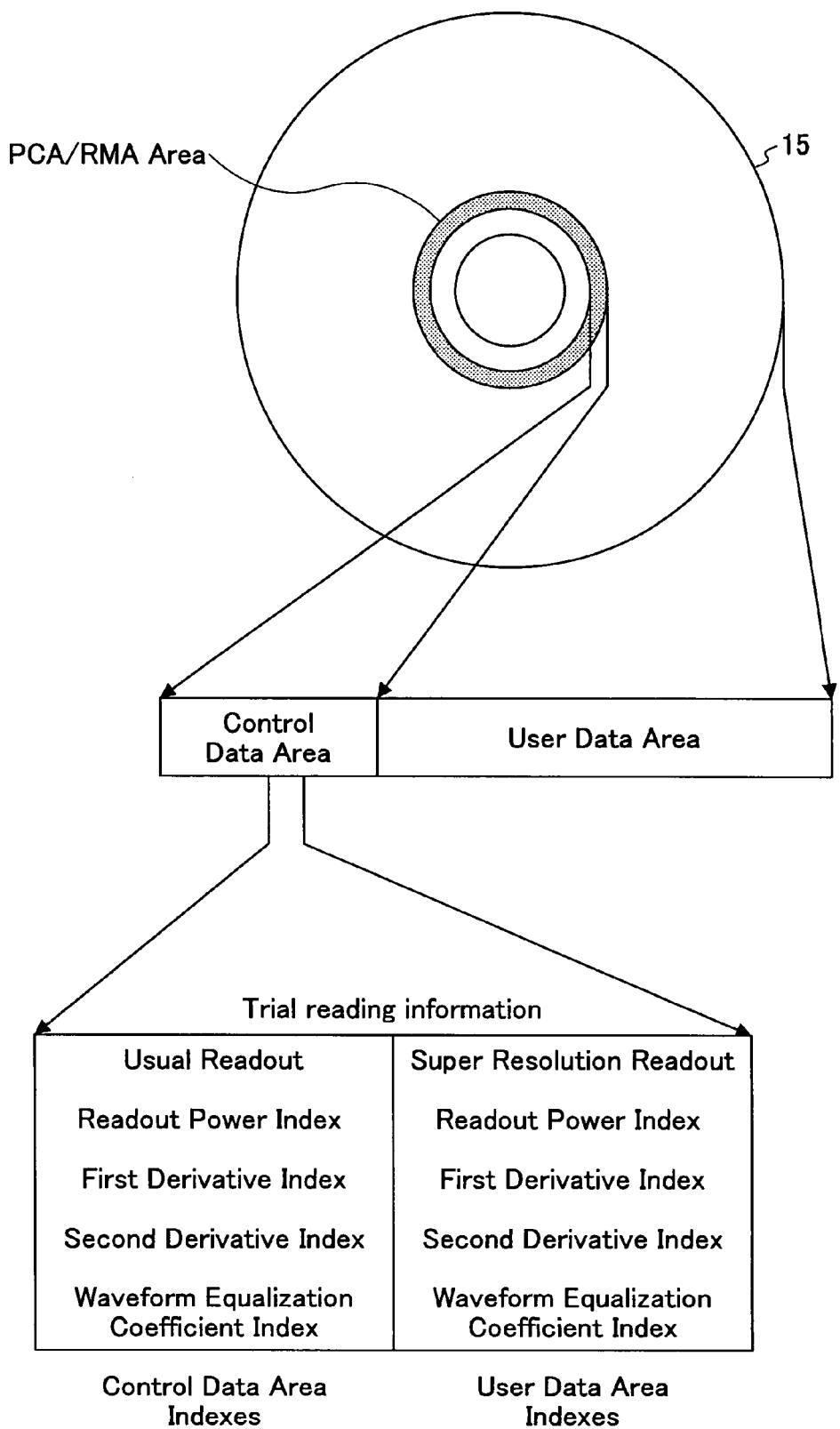
FIG. 5 is a diagram illustrating a configuration of the optical disk 15 according to the present embodiment.

FIG. 5 is a diagram illustrating a configuration of the optical disk 15 according to the present embodiment.

As shown in FIG. 5, the optical disk 15 includes a control data area and a user data area. The control data area includes a PCA (Power Calibration Area) and a RMA (Recording Management Area). In the control data area, data are recorded at a recording density not exceeding the diffraction limit (referred to as "usual readout"). In the user data area, data are recorded at a recording density exceeding the diffraction limit (referred to as "super resolution readout").

Trial reading information (indexes) are recorded in the control data area, and the trial reading information includes indexes of the control data area and indexes of the user data area.

The indexes of the control data area include an index of the readout power in the usual readout, an index of a first derivative in the usual readout, an index of a second derivative in the usual readout, and an index of a waveform equalization coefficient in the usual readout.

The indexes of the user data area include an index of the readout power in the super resolution readout, an index of a first derivative in the super resolution readout, an index of a second derivative in the super resolution readout, and an index of a waveform equalization coefficient in the super resolution readout.

Returning to FIG. 3, in step 401 an appropriate readout power in the usual readout (a default value) is output to the LD driving circuit 24.

In step 403, the optical disk drive 20 reads out the trial reading information (indexes) in the control data area of the optical disk 15.

In step 405, for example, it is determined whether the optical disk 15 is capable of the super resolution readout based on whether the trial reading information exists in the control data area of the optical disk 15.

If the trial reading information exists in the control data area of the optical disk 15, it is determined that the optical disk 15 is capable of the super resolution readout, and the routine proceeds to step 407. Otherwise, if the trial reading information does not exist in the control data area of the optical disk 15, the routine proceeds to step 457 in FIG. 4.

In step 407, a range of the readout power for trial reading and an increase in the readout power are calculated based on the trial reading information. Here, the range of the readout power for trial reading is referred to as "readout power range" for purposes of convenience, and is denoted as Pr(1) to Pr(n) with Pr(1) represents a lower limit and Pr(n) represents an upper limit. The increase in the readout power is denoted as ΔPr.

Specifically, the readout power range Pr(1) to Pr(n) is set with the index of the super resolution readout power included in the trial reading information as a center value, and the readout power is varied stepwise for n times and trial reading is performed with n different readout powers. Hence, the increase in the readout power is obtained.

In step 409, the readout power Pr is set to be an initial value Pr(1).

In step 411, the readout power Pr is used to read a specified area of the user data area (except areas including reading information, such as a read-in area, and a read-out area), and the level data are obtained via the AD conversion circuit 18c. For example, the specified area may be an area where test patterns (used for trial reading) are recorded. This region is referred to as a test pattern area. Instead of the specified area, the trial reading may be performed in a PCA area or an area including the PCA area.

In step 413, the light quantity of the light from the light source LD is calculated based on output signals from the LD light quantity detection circuit 25. For convenience, the light quantity of the light from the light source LD is referred to as "light source light quantity".

In step 415, the set of data of the readout power Pr, the obtained level data, and the obtained light source light quantity are stored in the memory 41.

In step 417, the increase in the readout power ΔPr is added to the current readout power Pr, and a new readout power Pr is obtained.

In step 419, it is determined whether the new readout power Pr is larger than the upper limit Pr(n).

If the new readout power Pr is less than or equal to the upper limit Pr(n), the routine returns to step 411, and steps 411 to 419 are repeatedly executed until the new readout power Pr becomes larger than the upper limit Pr(n). As a result, many sets of data of the readout power Pr, the obtained level data, and the obtained light source light quantity are stored in the memory 41.

When the new readout power Pr is larger than the upper limit Pr(n), the routine proceeds to step 421.

In step 421, the reflectivity is calculated by dividing the level data in the memory 41 by the corresponding readout power Pr in the memory 41, or by a readout power calculated from the corresponding light source light quantity in the memory 41, and then the obtained reflectivity is normalized.

Figure 6A:
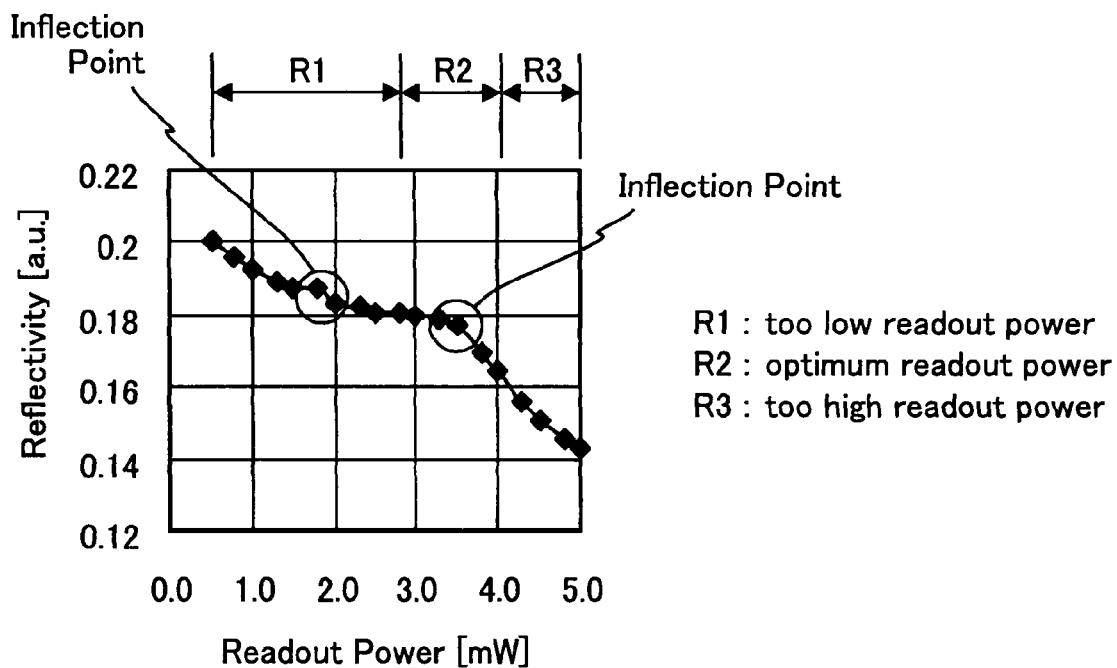
FIG. 6A is a graph showing an example of the relationship between the reflectivity and the readout power.

FIG. 6A is a graph showing an example of the relationship between the reflectivity and the readout power when the optical disk 15 has a readout layer formed from AgInSbTe and the optical disk 15 is recordable at a recording density two times higher than the diffraction limit.

As shown in FIG. 6A, in a region R1 near the lower limit of the readout power range, the heating temperature of the readout layer is low, and even when the temperature distribution within the light spot of the condensed light is considered, there is not sufficient optical property change to induce a change of the reflectivity. Hence, the readout power is too low for performing the super resolution readout.

In a region R2 near the center of the readout power range, the heating temperature of the readout layer rises, and in a portion of the temperature distribution within the light spot of the condensed light, melting is induced. The reflectivity or the phase different is changed, and due to this, partial optical property change occurs and the super resolution readout becomes possible. In this case, the readout power is near the optimum readout power for the super resolution readout.

In a region R3 near the upper limit of the readout power range, the heating temperature of the readout layer is further increased, the whole area within the temperature distribution within the light spot of the condensed light is melted, and the reflectivity is changed. In this case, although optical property change occurs, the light spot becomes a uniform spot area; thus the recording limit cannot exceed the diffraction limit. In this case, the readout power is excessively large for the super resolution readout.

In step 423, the first derivative γ is calculated by using the following equation (1).

$$\gamma = d(\text{reflectivity})/d(\text{readout power}) \quad (1)$$

Figure 6B:
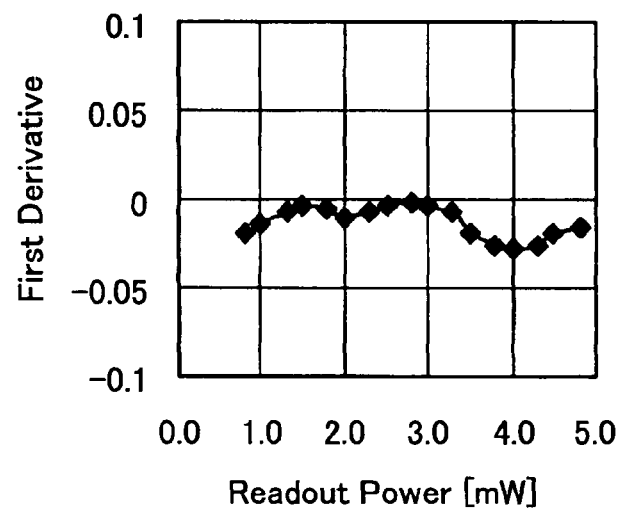
FIG. 6B is a graph showing an example of the relationship between the first derivative and the readout power.

FIG. 6B is a graph showing an example of the relationship between the first derivative and the readout power.

In step 425, the second derivative γ' is calculated by using the following equation (2).

$$\gamma' = d(\gamma)/d(\text{readout power}) \quad (2)$$

For optical disks having a readout layer formed of common phase-change materials, as illustrated below in FIG. 8, the optimum super resolution readout power is defined to be a value which results in a high CNR (Carrier-to-Noise Ratio) value over the entire frequency region of the modulated data.

Figure 8:
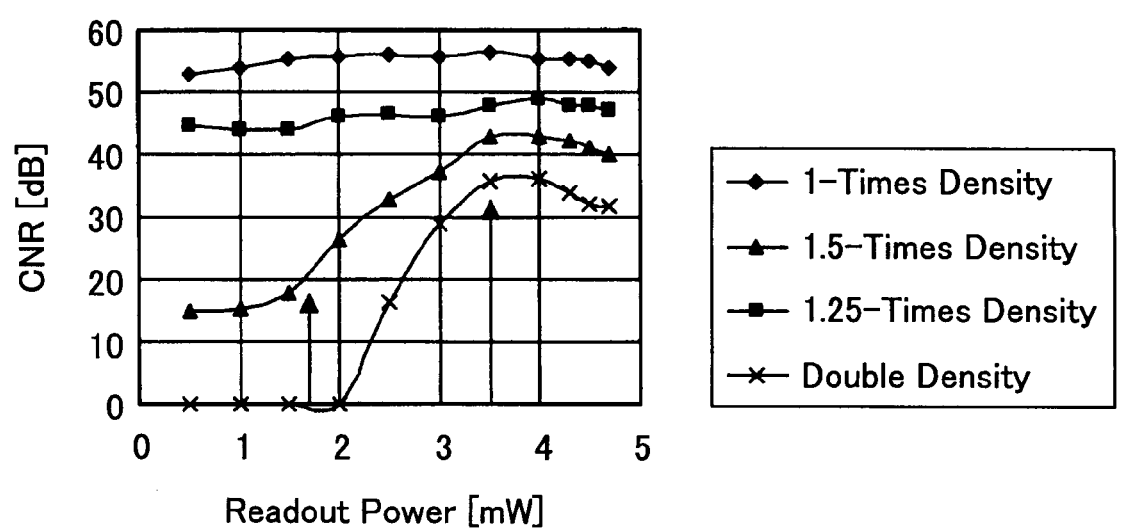
FIG. 8 shows graphs illustrating the relationship between CNR and the readout power.
Figure 9A:
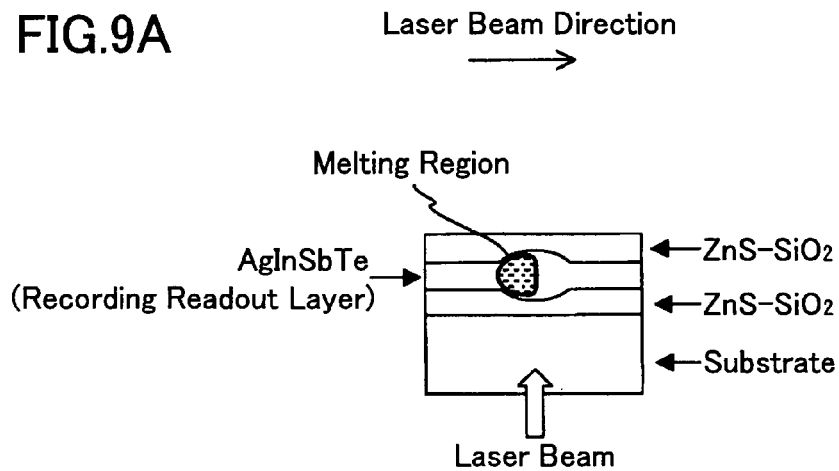
FIG. 9A through FIG. 9C are schematic cross-sectional views illustrating examples of configurations of the optical disk capable of the super resolution readout.
Figure 9B:
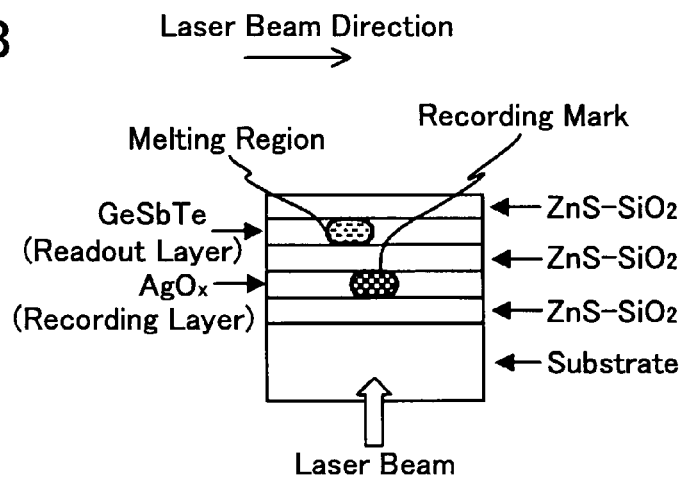
Figure 9C:
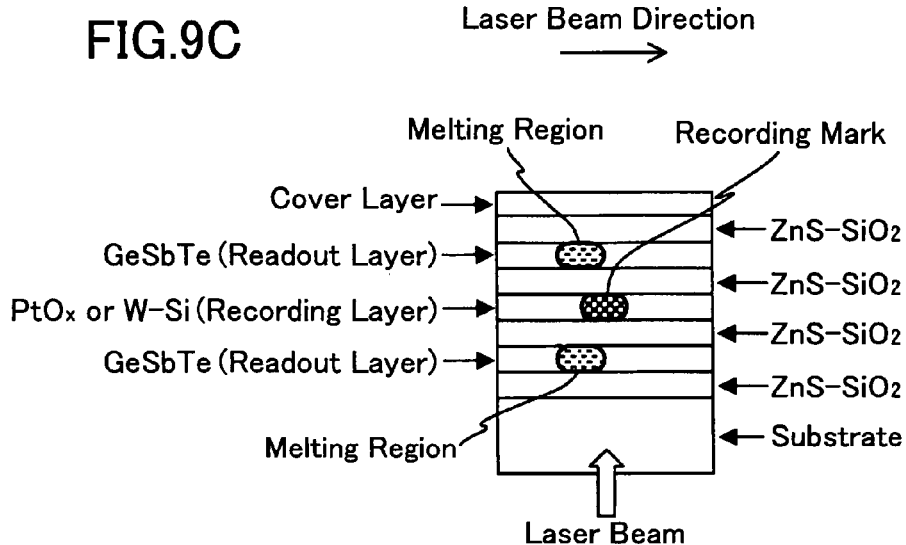

FIG. 8 shows graphs illustrating the relationship between CNR and the readout power.

Comparing FIG. 6B to FIG. 8 and closely examining behavior of the readout power resulting in a high CNR and the first derivative of the readout power, it is found that the first derivative of the readout power decreases monotonically when the readout power is in a range resulting in a high CNR. Upon that, to further study behavior of the readout power, the first derivative, which indicates a change gradient of the reflectivity, is further derived to obtain the second derivative of the readout power as expressed by the above equation (2).

Figure 7A:
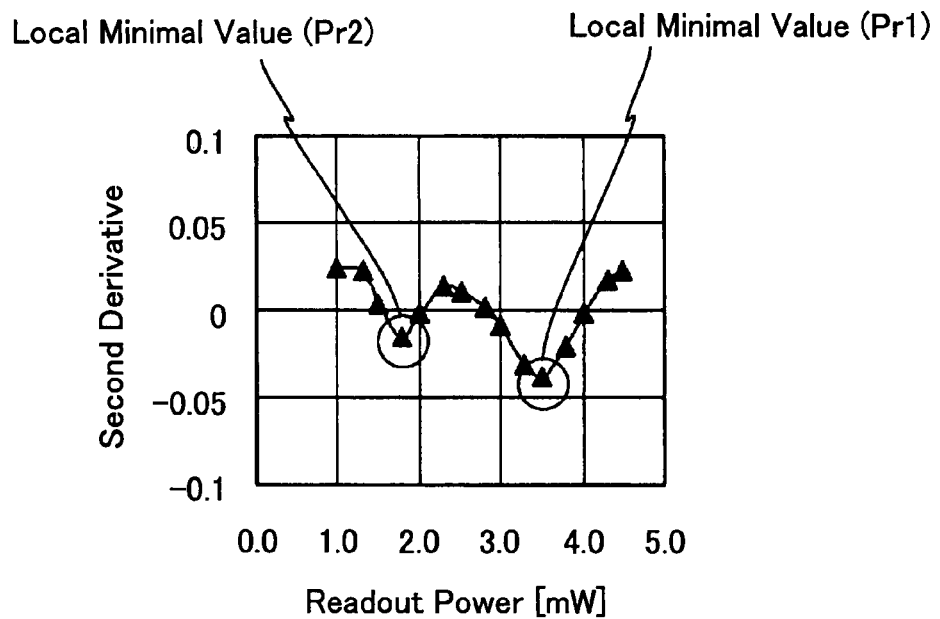
FIG. 7A is a graph showing an example of the relationship between the second derivative and the readout power based on the equation (2)

FIG. 7A is a graph showing an example of the relationship between the second derivative and the readout power based on the equation (2).

As shown in FIG. 7A, the second derivative has two local minimal values, and these two local minimal values correspond to inflection points of the reflectivity as shown in FIG. 6A. The lower one of the two readout powers, which two readout powers are associated with the two local minimal values of the second derivative, corresponds to the readout power which starts to induce the super resolution readout. This lower readout power is indicated as Pr2 in FIG. 7A. In addition, the higher one of the two readout powers, which two readout powers are associated with the two local minimal values of the second derivative, is consistent with the readout power which results in the maximum CNR value, and can be regarded as the optimum readout power for the super resolution readout. This readout power is indicated as Pr1 in FIG. 7A.

In step 427, the local minimal value of the second derivative corresponding to the higher readout power is calculated.

The local minimal value of the second derivative can be calculated by first formulating an approximate quadratic equation of the readout power and the second derivative, and finding solutions to the equation. Then it is easy to find the local minimal value of the second derivative. During this calculation, the method of calculating the optimum recording power for trial writing on a recordable optical disk can be utilized.

In step 429, the higher readout power of the two readout powers, which are associated with the two local minimal values of the second derivative, is identified to be the optimum readout power for the super resolution readout. The optimum readout power is denoted as Pr01.

Proceeding to FIG. 4, in step 451 shown in FIG. 4, the local minimal value of the second derivative corresponding to the lower readout power Pr2 is calculated. As described above, since the lower readout power Pr2 corresponds to the readout power which starts to induce the super resolution readout, it can be used to calculate the readout power for usual readout. Since the lower readout power Pr2, which corresponds to one of the local minimal values, starts to induce variation of optical properties of the readout layer within the light spot of the condensed light, the lower readout power Pr2 is equivalent to an upper limit of the usual readout power. Hence, if this upper limit of the usual readout power can be determined, it is possible to specify the optimum readout power for the usual readout.

In step 453, a readout power Pr02 is calculated by using the following equation (3).

$$Pr02 = \rho 2 \times Pr2 \quad (3)$$

Here, $\rho 2$ is a correction coefficient, which is in a range from 0.5 to 0.8, and is an intrinsic value depending on properties of the optical disk 15. For example, when the readout layer is formed of phase-change materials, $\rho 2$ is 0.6.

In step 455, the thus obtained readout power Pr02 is identified as the optimum readout power for the usual readout. In this way, the optimum readout power for the usual readout can be determined easily.

In step 457, the driving system (not illustrated) is directed to drive the optical pickup 23 so that a light spot is formed near a target position corresponding to a specified address included in a readout request. Upon that, a seek operation is started. Then, after the seek operation is finished, the routine proceeds to step 459. Note that when the seek operation is not necessary, it can be omitted.

In step 459, it is determined whether the optical disk 15 is capable of the super resolution readout.

If the optical disk 15 is capable of the super resolution readout, the routine proceeds to step 461. If the optical disk 15 is not capable of the super resolution readout, the routine proceeds to step 462.

Note that when it is found that the trial reading information does not exist in the control data area of the optical disk 15 in step 405, in step 459, it is determined that the optical disk 15 is not capable of the super resolution readout.

In step 461, the optimum readout power Pr01 for the super resolution readout is output to the LD driving circuit 24. Then, the routine proceeds to step 463.

In step 462, the optimum readout power Pr02 for the usual readout is output to the LD driving circuit 24. Then, the routine proceeds to step 463.

In step 463, the optical disk drive 20 starts to read out data from the optical disk 15.

In step 465, it is determined whether the readout process is completed. If the readout process is not completed, the routine cycles at step 465 to continue the readout until the readout process is completed.

Note that instead of the above equation (1), the first derivative y can also be calculated by using the following equation (4).

$$\gamma = d(\text{reflectivity})/d(\text{readout power}) \times (\text{readout power}/\text{reflectivity}) \quad (4)$$

In addition, instead of the above equation (2), the second derivative $\gamma'$ can also be calculated by using the following equation (5).

$$\gamma' = d(\gamma)/d(\text{readout power}) \times (\text{readout power}/\gamma) \quad (5)$$

Figure 7B:
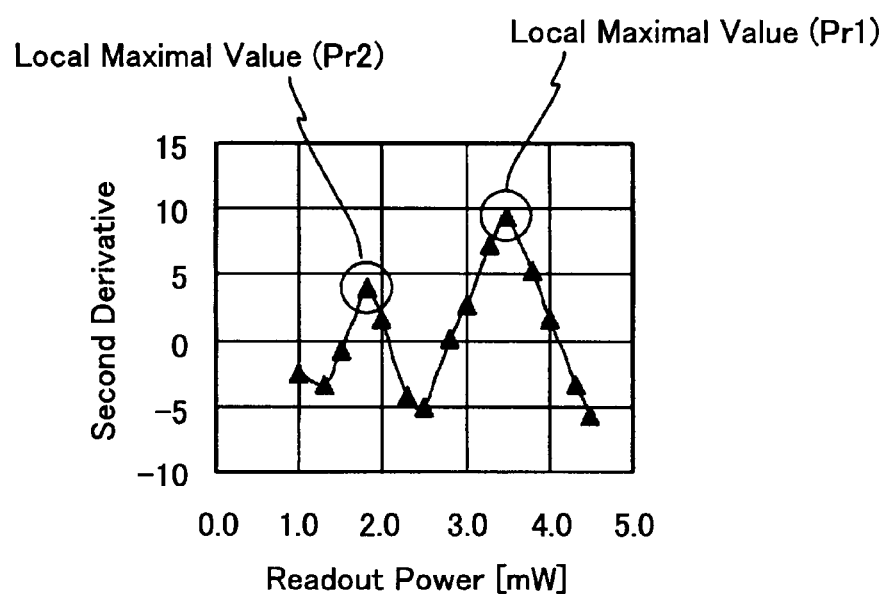
FIG. 7B is a graph showing an example of the relationship between the second derivative and the readout power based on the equation (5)

FIG. 7B is a graph showing an example of the relationship between the second derivative and the readout power based on the equation (5).

As shown in FIG. 7B, the second derivative has two local maximal values, and similar to the situation shown in FIG. 7A, these two local maximal values correspond to inflection points of the reflectivity as shown in FIG. 6A. The lower one (Pr2) of the two readout powers, which are associated with the two local maximal values of the second derivative, corresponds to the readout power which starts to induce the super resolution readout, and the higher one (Pr1) of the two readout powers, which are associated with the two local minimal values of the second derivative, is consistent with the readout power which results in the maximum CNR value, and can be regarded as the optimum readout power for the super resolution readout.

However, during the super resolution readout on the optical disk 15, due to heat generated by the readout power, in the readout layer, the optical properties of the backward portion of the light spot of the condensed light change. Because the light intensity in the backward portion of the light spot is low in the light intensity distribution of the reflected light, the intensity of the reflected light is asymmetric when the light spot moves on a recording mark or a pit and when the light spot moves away from the recording mark or the pit, and consequently, a phase shift occurs in the readout signals. In order to correct this phase shift, a waveform equalization circuit can be used to perform signal processing. It is preferable to use an asymmetric FIR filter to construct the waveform equalization circuit for effectively correcting the phase shift. For example, the waveform equalization circuit including the asymmetric FIR filter includes multi-stage delay units, multipliers which multiply the reflected light quantity delayed by the respective multi-stage delay units with respective waveform equalization coefficients (multiplication factors), and an accumulative unit which sums all the multiplication results. It is sufficient that the asymmetric FIR filter be a common multi-tab FIR filter, and, as a digital filter, can perform calculation. In this case, the delay time of the delay units is equal to one cycle (1T) of the readout clock signal.

The phase shift in the readout signals changes depending on the readout power during the super resolution readout, and the asymmetry of the intensity of the reflected light also changes. Further, since the optical properties also change depending on types of the optical disk, the optimum waveform equalization coefficients can be set in the asymmetric FIR filter by setting the optimum readout power and appropriate waveform equalization coefficients for compensating for the phase shift at the same time.

In the present embodiment, the index of the waveform equalization coefficient in the index of the readout power in the super resolution readout and the index of the second derivative, which are stored in the optical disk 15 in advance, can be used to set the optimum waveform equalization coefficients in the asymmetric FIR filter.

According to the optical disk drive 20 of the embodiment of the present invention, the light emission power of the laser beam is changed while the laser beam is irradiated onto the optical disk 15, and the reflectivity of the optical disk 15 is acquired corresponding to each light emission power level. Then, the second derivative of a curve representing correlation between the reflectivity and the light emission power is calculated with respect to the light emission power, and the extreme values of the second derivative are calculated. The higher one of two readout powers associated with two extreme values of the second derivative is identified as the optimum readout power for the super resolution readout, and the optimum readout power for the usual readout is determined based on the lower one of the two readout powers associated with the two extreme values of the second derivative. Therefore, it is possible to reproduce the optical disk capable of super resolution readout with high accuracy.

In addition, according to the optical disk drive 20 of the embodiment, it is possible to calculate the optimum readout power for the super resolution readout and the optimum readout power for the usual readout easily and quickly with high accuracy.

In addition, according to the optical disk drive 20 of the embodiment, since the trial reading information is used to calculate the ranges of the readout power and the increase of the readout power when reading the trial reading information, it is possible to reliably perform the trial reading process, which includes the trial reading with the optimum readout power.

In addition, according to the optical disk drive 20 of the embodiment, it is possible to obtain the optimum readout power with high accuracy even when individual differences exist between different optical disks and different optical disk drives, the oscillation wavelength of the light source and the temperature changes, and the environment changes.

According to the data readout method, the data readout device, and the optical disk of the present invention, it is possible to reproduce an optical disk capable of super resolution readout with high accuracy.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, the trial reading information may include wobbling information or pre-pit information as a part of the pre-format information.

In addition, in the above it is described that the trial reading information stored in a control data area of the optical disk 15. The present invention is not limited to this, but the trial reading information corresponding to the optical disk 15 may be obtained in advance, and stored in an inner memory of the optical disk drive 20.

In addition, in the above, it is described that the optical disk drive can only read data out from an optical disk; the present invention is not limited to this, but the present invention is applicable to any optical disk drive capable of at least readout (reproduction) among recording, readout, and deletion.

In addition, in the above, it is described that the optical pickup has only one light source. The present invention is not limited to this, but the present invention is applicable to any optical pickup having plural light sources emitting light of different wavelengths.

This patent application is based on Japanese Priority Patent Application No. 2006-203101 filed on Jul. 26, 2006, the entire contents of which are hereby incorporated by reference.

What is claimed is:

1. A data readout method for reading data recorded in an optical disk by irradiating a laser beam onto the optical disk, said method comprising the steps of:

varying a light emission power level of the laser beam while the laser beam is irradiated on the optical disk, and acquiring a reflectivity of the optical disk corresponding to each of the light emission power levels;

calculating a second derivative of a curve representing correlation between the reflectivity and the light emission power with respect to the light emission power;

calculating an extreme value of the second derivative; and calculating an optimum readout power level for super resolution readout based on the extreme value, wherein said super resolution readout, data recorded at a recording density beyond a diffraction limit are read out; and wherein in the step of calculating the extreme value, two extreme values are calculated, and in the step of calculating the optimum readout power for super resolution readout, two light emission power levels are obtained corresponding to the two extreme values, respectively, and a larger one of the two light emission power levels is selected as the optimum readout power for super resolution readout; and wherein data having a recording density not exceeding the diffraction limit is recorded in the optical disk, said method further comprising a step of: calculating an optimum readout power for usual readout based on a smaller one of the two light emission power levels respectively corresponding to the two extreme values, wherein said usual readout, data recorded at a recording density not exceeding the diffraction limit are read out.

2. A data readout method for reading data recorded in an optical disk by irradiating a laser beam onto the optical disk, said method comprising the steps of:

varying a light emission power level of the laser beam while the laser beam is irradiated on the optical disk, and acquiring a reflectivity of the optical disk corresponding to each of the light emission power levels;

calculating a second derivative of a curve representing correlation between the reflectivity and the light emission power with respect to the light emission power;

calculating an extreme value of the second derivative; and calculating an optimum readout power level for super resolution readout based on the extreme value, wherein said super resolution readout, data recorded at a recording density beyond a diffraction limit are read out; and wherein in the step of calculating the extreme value, two extreme values are calculated, and in the step of calculating the optimum readout power for super resolution readout, two light emission power levels are obtained corresponding to the two extreme values, respectively, and a larger one of the two light emission power levels is selected as the optimum readout power for super resolution readout; and wherein the two extreme values include a local maximal value and a local minimal value.

3. A data readout device for reading data recorded in an optical disk, comprising:
an optical head that includes
a light emission source,
an optical system directing a laser beam emitted from the light emission source onto the optical disk, and directing light reflected from the optical disk to a light receiving position, and
an optical detector arranged at the light receiving position;
a reflectivity acquisition unit that varies a light emission power level of the laser beam while the laser beam is irradiated onto the optical disk, and acquires a reflectivity of the optical disk corresponding to each light emission power level based on an output signal from the optical detector; and
a calculation unit that calculates an extreme value of a second derivative of a curve representing correlation between the reflectivity and the light emission power with respect to the light emission power; and
a readout power acquisition unit that acquires an optimum readout power level for super resolution readout based on the extreme value, therein said super resolution readout, data recorded at a recording density beyond a diffraction limit are read out and
wherein the calculation unit calculates two extreme values, and the optimum readout power acquisition unit selects a larger one of two light emission power levels corresponding to the two extreme values as the optimum readout power for super resolution readout; and
wherein the optimum readout power acquisition unit selects an optimum readout power level for usual readout based on a smaller one of the two light emission power levels respectively corresponding to the two extreme values, wherein said usual readout, data recorded at a recording density not exceeding the diffraction limit are read out.

4. The data readout device as claimed in claim 3, wherein the optical disk includes a control data area in which data are recorded at a recording density not exceeding the diffraction limit; and a user data area in which data are recorded at a recording density exceeding the diffraction limit, said data readout device further comprises: a readout power designation unit that designates the smaller readout power to be the optimum readout power for usual readout when reading the control data area, and designates the larger readout power to be the optimum readout power for super resolution readout when reading the user data area.

5. A data readout device for reading data recorded in an optical disk, comprising:
an optical head that includes
a light emission source,
an optical system directing a laser beam emitted from the light emission source onto the optical disk, and directing light reflected from the optical disk to a light receiving position, and
an optical detector arranged at the light receiving position;
a reflectivity acquisition unit that varies a light emission power level of the laser beam while the laser beam is irradiated onto the optical disk, and acquires a reflectivity of the optical disk corresponding to each light emission power level based on an output signal from the optical detector; and
a calculation unit that calculates an extreme value of a second derivative of a curve representing correlation between the reflectivity and the light emission power with respect to the light emission power; and
a readout power acquisition unit that acquires an optimum readout power level for super resolution readout based on the extreme value, therein said super resolution readout, data recorded at a recording density beyond a diffraction limit are read out; and
wherein the calculation unit calculates two extreme values, and the optimum readout power acquisition unit selects a larger one of two light emission power levels corresponding to the two extreme values as the optimum readout power for super resolution readout; and
wherein the two extreme values include a local maximal value and a local minimal value.

6. An optical disk, comprising:
a readout layer enabling super resolution readout for reading data recorded at a recording density beyond a diffraction limit,
wherein pre-format information is recorded in the optical disk, said pre-format information including an index of a second derivative of a curve representing correlation between a reflectivity and the light emission power with respect to the light emission power, and an index of a readout power; and
wherein an index of a waveform equalization coefficient of the index of the second derivative and the index of the readout power is further recorded in the optical disk, said index of the waveform equalization coefficient serving as a setting value of the waveform equalization coefficient in waveform equalization processing for correcting phase distortion of a readout signal caused by an asymmetric optical property of the readout layer.

* * * * *